United States Patent [19]

Kramer

[11] Patent Number: 5,213,067
[45] Date of Patent: May 25, 1993

[54] INTERNAL COMBUSTION ENGINE

[76] Inventor: Louis E. Kramer, 5323 Elk Creek Rd., Middletown, Ohio 45042

[21] Appl. No.: 808,865

[22] Filed: Dec. 19, 1991

[51] Int. Cl.$^5$ .................... F02B 25/08; F02B 75/28; F02B 75/04; F02M 25/02
[52] U.S. Cl. .................... 123/51 BA; 123/51 BD; 123/25 A; 123/78 F
[58] Field of Search ........... 123/51 B, 51 BA, 51 BC, 123/51 BD, 51 R, 25 A, 48 B, 78 F

[56] References Cited

U.S. PATENT DOCUMENTS

| | | | |
|---|---|---|---|
| 2,858,816 | 11/1958 | Prentice | 123/51 BA |
| 3,847,124 | 11/1974 | Kramer | 123/51 B |
| 4,215,660 | 8/1980 | Finley | 123/51 B |
| 4,856,463 | 8/1989 | Johnston | 123/51 BA |

Primary Examiner—Willis R. Wolfe
Attorney, Agent, or Firm—Joseph G. Nauman

[57] ABSTRACT

An internal combustion engine is provided having opposed pistons operating in axially spaced relation within common power cylinders. Opposed heads of the pistons define a space within which occurs a cycle of compression, ignition, combustion, and expansion. One piston controls exhaust ports, and the other piston controls air injection and fuel-air charge injection ports. Additional air injection ports, and associated supply passages or tubes, are provided to admit compressed air over the head of the exhaust piston to cool the exhaust piston head and also form a gas flow inhibiting region below the exhaust port, near the end of the power/exhaust stroke. Rotary valves control the in-flow of air and air-fuel charge to charging cylinders. Air injection ports have an optional improved construction to enhance air injection into the power cylinders. Throttle valves controlling flow of air into purge air charging cylinders are provided as an option. Water injection, particularly into the purge air, is a further option. An optional mechanism can be added for changing the phase relationship between the two opposed pistons in a common cylinder, whereby timing of opening of the exhaust port and the auxiliary air injection port can be changed according to changes in engine r.p.m.

8 Claims, 6 Drawing Sheets

INTERNAL COMBUSTION ENGINE

BACKGROUND OF THE INVENTION

This invention relates to an internal combustion engine of the type having opposed pistons operating in axially spaced relation within common power cylinders. The general layout and organization of such an engine is shown and described in my prior U.S. Pat. No. 3,847,124 issued 12 Nov. 1974. A common combustion cylinder receives the opposed heads of the pistons and with them defines a space (e.g. a power cylinder) within which occurs a cycle of compression, ignition, combustion, and expansion. One piston controls exhaust ports, and is generally referred to as the exhaust control piston; the other piston controls air injection and fuel-air charge injection ports, and is generally referred to as the charge control piston.

Preferably, this cycle occurs every stroke of the pistons according to the familiar two-cycle process. The pistons operate separate charging pistons. This is preferably done by forming larger annular charging pistons attached to, or integral with, the main pistons (e.g. providing stepped pistons), and providing charging cylinders coaxial with the main or combustion cylinders but of greater diameter, located at opposite ends of each combustion cylinder. A air-fuel charge is introduced into two of the charging cylinders during the power stroke of the pistons. That gas is compressed in one of the charging cylinders during the compression stroke of the pistons and is transferred to the opposite combustion cylinder through appropriate cross-ducts or passages. The other charging cylinder compresses air alone, and its output is directed to the other combustion cylinder through additional cross passages for supercharging purposes. The difference in volumes of one combustion cylinder and the total volume of the two corresponding charging cylinders determines the amount of supercharge available from a given mechanical design.

The engine preferably includes at least a pair of such compound cylinder assemblies in each of which two pistons operate. The two sets of pistons are connected to a common crank so as to operate 180° out of phase. Thus when one of the cylinder assemblies has fired and the products of combustion in the main cylinder of the other cylinder assembly are being exhausted through an exhaust port, compressed air is directed into that main cylinder, across the head of the charge control piston, from a charging cylinder of the other cylinder assembly to purge products of combustion. Then a fuel-air charge is injected into that main cylinder from the other of the charging cylinders in the other cylinder assembly, to be fired as the cycle advances.

SUMMARY OF THE INVENTION

The present invention provides a number of improvements to the above-described engine and to my previous U.S. Pat. No. 3,847,124. Additional air injection ports, and associated supply passages or tubes, are provided to admit compressed air over the head of the exhaust piston. This additional air injection cools the exhaust piston head and also forms a gas flow inhibiting region below the exhaust port, near the end of the power/exhaust stroke. Creating this region of expanding air tends to counter the then prevailing flow of products of combustion out the exhaust port, and minimizes the tendency of on-going exhaust flow (inertial in nature) to pull unburned new charge out of the cylinder. The compressed air supply to these additional air injection ports is obtained from the air-only charging cylinders, and requires only a minimum of additional passage or duct work.

In addition, the invention provides special rotary valves which control the in-flow to the charging cylinders in a precise manner, allow better filling of the charging cylinders, and also avoid disadvantages of reed-type check valves heretofore used. The air injection ports, associated with the compressed air purge feature of the charging system, also have an optional improved construction which can enhance the flow of air injection into the power cylinders. Throttle valves controlling the flow of air into the purge air charging cylinders are provided as another option. Water injection, particularly into the purge air, is a further option which will, particularly at higher engine speeds and heavy loads, tend to provide a cooler and more dense charge, and to provide a more even and uniform rate of combustion.

The invention also provides an optional mechanism for changing the phase relationship between the two opposed pistons in a common cylinder, whereby the timing of the opening of the exhaust port and the auxiliary air injection port can be changed according to changes in engine r.p.m.

Thus, the object of this invention is to provide improvements in the construction and method of operation of such an internal combustion engine in which products of combustion are more effectively separated from incoming fuel-air charges and more effectively discharged from the combustion cylinder while reducing bypass of fuel-air charge to the exhaust flow, and in which both piston heads operating within the combustion chamber are subjected to a flow of cooling air from the charging cylinders before a new charge is compressed and ignited; to provide an optional mechanism for changing the operating phase relation of the opposed pistons according to engine r.p.m.; to provide such an engine with improved rotary air intake valves; to provide such an engine with optional water injection for improvement in the combustion rate in the power cylinders, together with some additional cooling; to provide optional throttle plates in the intakes to the injection air charging cylinders; and to provide in such an engine optional improvement in the construction of the main air injection ports which affords greater port area while simplifying the construction of those ports and associated chambers.

Other objects and advantages of the invention will be apparent from the following description, the accompanying drawings and the appended claims.

DESCRIPTION OF THE PREFERRED EMBODIMENT

In the following detailed description and the drawings, like reference numbers indicate like parts, and similar parts are indicated by the addition of letter suffixes to the reference numerals. The same or similar reference numbers as used in my prior patent are employed where possible to identify like parts.

Block, Crankcases and Pistons Arrangement

Figure 1:
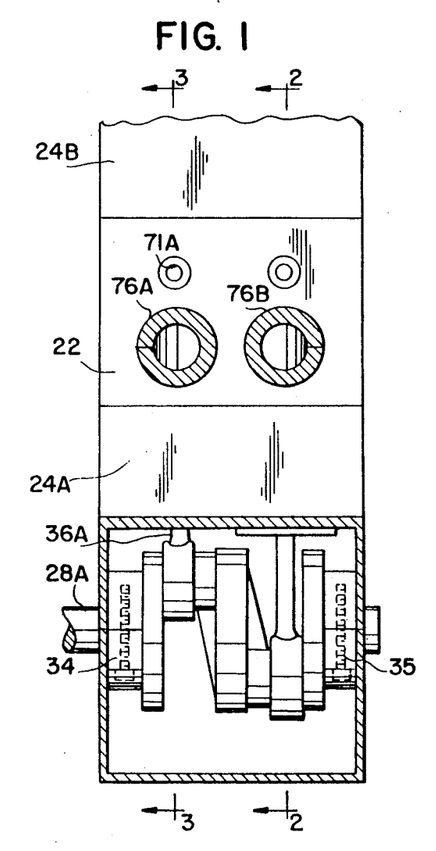
FIG. 1 is a top elevation view of an internal combustion engine constructed in accordance with an embodiment of this invention, with only one of the two crankcases shown, and the cover and portion of the illustrated crankcase shown in section to reveal the crank ends and one crankshaft.

FIG. 1 shows a two cylinder internal combustion engine constructed in accordance with an embodiment of this invention which includes a central case or block 22, crank cases 24A and 24B (at opposite ends of block 22) and crank case covers (only cover 26A is shown), all of which are held in assembled relation by appropriate fastenings, not shown. Crank shafts 28A and 28B (see FIG. 11) are rotatably mounted in crank cases 24A and 24B, respectively, and the structure of each case and crankshaft is essentially duplicated. The crankshafts are connected for synchronous rotation, either by appropriate sprockets and chains (as in my U.S. Pat. No. 3,847,124) or by shafts and meshing high precision spiral bevel gears.

As shown in FIG. 1, crank shaft 28A is rotatably mounted in bearings 34 and 35 mounted in the crank case 24A. Connecting rods 36A and 36B are rotatably secured (as by typical bearings not shown) to offset crank arms 37A and 37B of crank shaft 28A. Similar connecting rods 36C and 36D are connected to crank shaft 28B.

Block 22 contains two main or combustion cylinders 40A and 40B, with which the aforementioned connecting rods and crank arms are aligned. Within cases 24A and 24B there are charging cylinders 41A and 51A aligned with opposite ends of cylinder 40A, and charging cylinders 41B, 51B aligned with opposite ends of cylinder 40B. It should be noted that these cylinders may be formed as liners fitted into the cases, and can provide the additional function, with their associated charging pistons, of forming a large coaxial guiding surface which promotes good alignment of the main pistons within the main cylinders. A stepped exhaust control piston 42A is fitted in cylinder 40A (FIGS. 3 and 11) and is connected to rod 36A. Piston 42A includes a first cylindrical head 45A at its inner end within cylinder 40A, and a second annular head 46A of greater diameter, operating within a charging cylinder 41A.

In a similar fashion, an opposing charge control piston 52A is fitted within cylinder 40A and connected to rod 36C, thus head 55A of the piston 52A moves toward and away from piston head 45A in synchronism. The charging piston head 56A operates in charging cylinder 51A, which is in the other crank case.

It will be apparent that main pistons 42B and 52B are fitted in cylinder 40B, and secondary or charging pistons 46B and 56B operate in charging cylinders 41B and 51B, in like manner, with the movement of those pistons 180° out of phase with pistons 42A, 52A. The diameter of the charging cylinders can be varied to compress and air charge, and fuel-air charge, of predetermined greater volume than the displacement of the main pistons, thereby to achieve a desired supercharge ratio.

Figure 2:
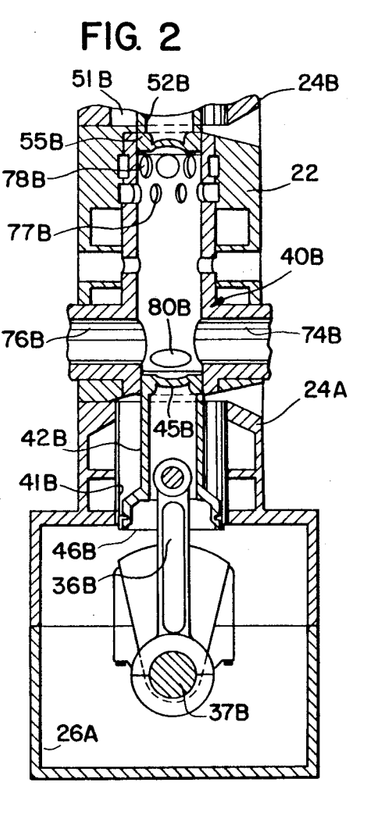
FIG. 2 is an enlarged view in section taken on the line 2—2 in FIG. 1, air and fuel valves are omitted for clarity, and the air intake ports to the charging cylinders are rotated 90° around the cylinders for ease of illustration.
Figure 11:
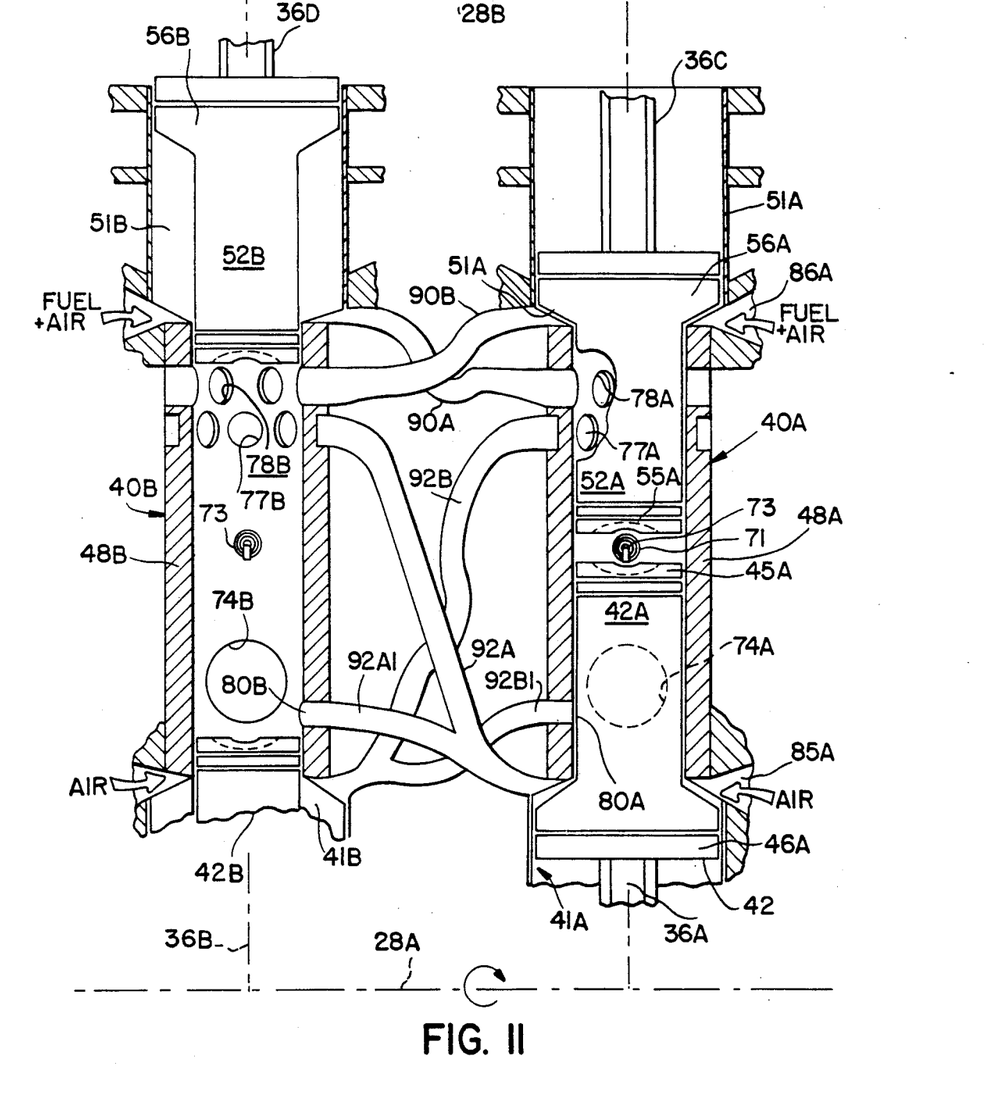
FIG. 11 is a schematic sectional layout view of a two cylinder engine designed according to the invention.

Cylinders 40A and 40B are similar in construction, being complementary in configuration, thus only one central tube 48, its ports, and connections thereto will be described in detail. At the midsection of these cylinders are threaded openings 71A and 72A, and 71B, 72B which receive spark plugs 73 (eg. two plugs per cylinder). Appropriate timing mechanism (not shown) is associated with the crank shafts for firing the spark plugs when the pistons are adjacent their inner position as shown in FIG. 2 and 11. The clearance between the opposed piston heads 45A, 55A is exaggerated for purposes of illustration, and it will be appreciated by those skilled in the art that this clearance (which with the surrounding piston wall defines the combustion chamber at maximum compression) is only a few thousandths of an inch. The optional small cavities in the heads 45A, 45B and 55A, 55B can be located near the spark plugs to form a squelch area and improve the flame front during combustion, to promote a more even combustion rate.

Block 22 and crank cases 24A, 24B may include appropriate cavities or chambers for passage of liquid coolant around the cylinder tubes and the charging cylinders (as shown), although such cooling is not essential in all engine designs according to the invention, due to the use of compressed air as a medium for both internal cooling and for control in scavenging of products of combustion.

Cylinder Porting

Figure 3:
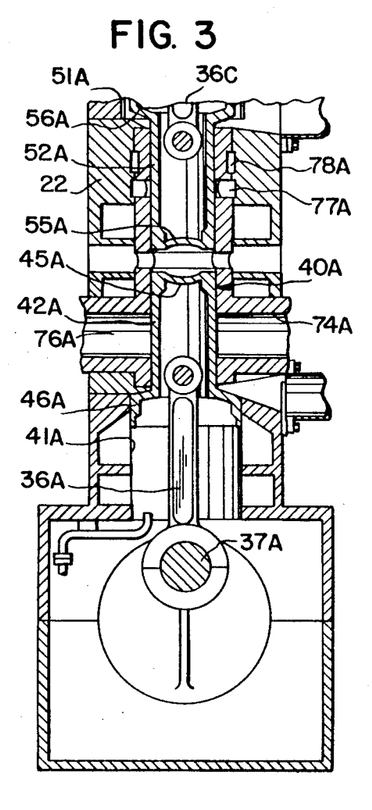
FIG. 3 is a view in section similar to FIG. 2, taken on the line 3—3 in FIG. 1.

Exhaust ports 74A and 76A are formed across from each other (FIGS. 2 and 3) in opposite sides of cylinder 40A, along the path of motion of piston 42A, and like exhaust ports 74B and 76B are formed in cylinder 40B. The exhaust ports are opened when the pistons 42A and 52A move to their outer positions as shown in FIG. 3, and are closed by the piston heads 45A and 55A (respectively) when the pistons move to their inner position. For description purposes, the pistons 42A and 42B are thus called the exhaust control pistons.

At the outer ends of the cylinders, as heads 45A and 55A continue to move outwardly, after opening of the exhaust ports, they uncover a row of air injection openings 77A (in cylinder 40A) and 77B (in cylinder 40B) at approximately the same time, or shortly after, the exhaust ports have been opened. Compressed air injected through the openings 77A, 77B acts to augment the already initiated exhaust flow and clear the products of combustion from the cylinders through the exhaust ports. Then, as heads 45A and 45B move further outwardly, they uncover a corresponding row of fuel-air charge injection openings 78A, 78B. Thus, for purposes of description the pistons 52A and 52B are designated the charge controlling pistons.

Figures 4, 5, 6:
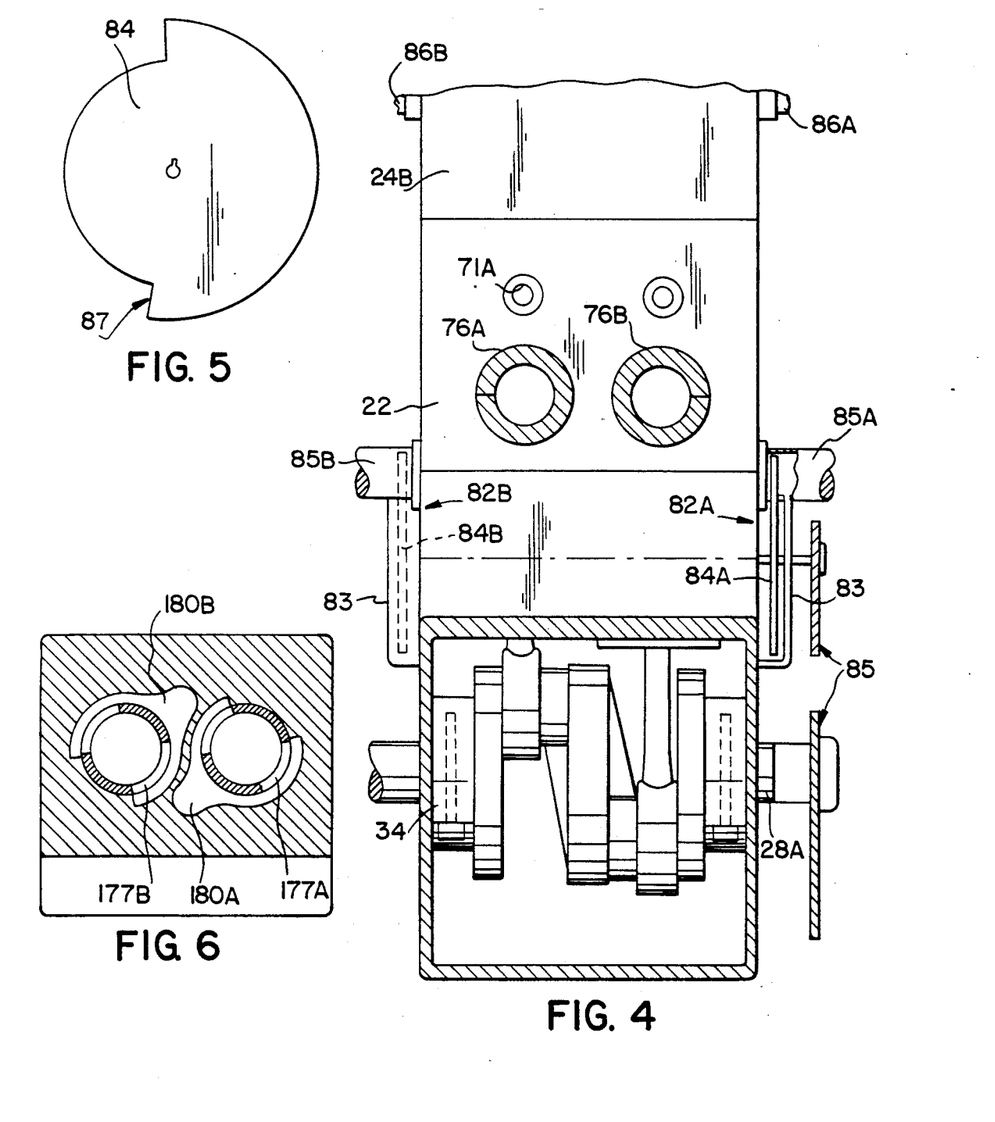
FIG. 4 is a somewhat diagrammatic view, similar to FIG. 1, showing two of the rotary valves.
FIG. 5 is a side view of one of the control plates or discs of the rotary valves.
FIG. 6 is a partial view showing optional improvements in the principal air injection ports and their associated chambers.

FIG. 6 shows a modification to the air injection port design, wherein lengthened slot-like ports 177A, 177B are provided opposite each other in the cylinder wall. This design is easier to cast and provides greater flow area. The surrounding passages 180A, 180B are formed about approximately three/quarters of the outside of the cylinder, providing greater strength in the casting surrounding the cylinder tube itself.

Auxiliary air injection ports 80A, 80B (FIGS. 11 and 12) are provided in the two cylinders, adjacent the lower (outer) ends of exhaust ports 74A, 74B. These auxiliary ports are for the purpose of adding air into the region above the exhaust control piston heads 45A, 45B at the time pistons 42A and 42B move through their "bottom dead center" positions.

Thus, considering one sequence in cylinder 40A, after compression and ignition of a charge, combustion follows and near the end of the resulting power stroke of the two pistons, first exhaust ports 74A, 76A are opened and outflow of products of combustion initiates through those ports. Next (or simultaneously), the main air injection ports 77A are opened (uncovered) and a flow of compressed air commences behind the initiated exhaust flow. This air flows across piston head 55A, tending to cool it, and forms a pressurized barrier between that head and the hot products of combustion. Next, the charge injection ports 78A are opened and a fuel-air charge under pressure begins to flow into the cylinder, behind the aforementioned air flow. This tends to separate the incoming fuel-air charge from the exhaust flow and minimize bypassing of the fuel-air charge directly to the exhaust port, and to minimize dilution of that charge by the hot products of combustion.

At approximately the same time as, or shortly after, the opening of ports 78A, the auxiliary air port 80A is opened. Compressed air enters the end of the cylinder beyond the exhaust port 74A, acts to cool piston head 45A, and also forms a pressurized region in opposition to further exhaust flow of the products of combustion out exhaust ports 74A, 76A. This tends to suppress or disrupt continued exhaust flow which might otherwise continue at substantial velocity due to the inertia of the high velocity gas flow and draw fuel-air charge with it through the exhaust ports. The compressed air from auxiliary port 80A eventually also tends to merge with the air from injection ports 77A and to minimize the concentration of any remaining products of combustion, provide a lower temperature fuel-air charge, and minimize tendency toward pre-ignition, particularly at higher engine r.p.m.

The pistons then begin moving inward, close off all the ports and compress the fuel-air charge. Ignition follows, and then the next power stroke begins as the pistons progress past top dead center.

Rotary Valves

The air which is injected through the charge openings 77A, 77B is compressed by the charging pistons 46A, 46B, respectively (FIG. 2). The air enters through rotary valves 82A, 82B (FIG. 4) which control the intake passages 85A, 85B to the respective charging cylinders 41A, 41B, and like rotary valves (not shown) which control intake passages 86A, 86B to the fuel-air charging cylinders 51A, 51B. The rotary valves replace the read-type check valves shown in my prior patent, and the intake passages are thus located at the sides of the charging cylinder.

Each rotary valve comprises a rotatably supported disk 84A, 84B mounted to traverse the corresponding intake passage, and surrounded by an appropriate cover 83. These discs have slots or windows 87 formed in them, aligned with the passages, so as to provide an opening into the charging cylinders only during traverse of the windows across the entrance passages. Discs 84A, 84B are rotated at crank shaft speed by appropriate 1:1 gearing 85 from crankshaft 28A. It is preferred that such gears also are spiral gears to minimize backlash and contribute to longer gear life. It will be understood that this rotary valve mechanism is duplicated for the fuel-air charging intakes.

When charging pistons 42A, 42B move outwardly, air is drawn through the windows of the rotary valves from air intake conduits or manifolds 90A, 90B, and enters the charging cylinders 41A, 41B. As the charging pistons 46A, 46B move inwardly, valves 82A, 82B close to prevent escape of the fuel-air charge. The rapid action of the described rotary valves opens and closes the inlets quickly and allows maximum time of opening to fill the charging cylinders more effectively.

A fuel-air mixture, which is to be injected through the ports 78A, is drawn into and compressed in charging cylinder 51B. The air-fuel mixture may be formed in an appropriate carburetor or throttle body injector (TBI) (not shown) and enters the charging cylinder. Air-fuel mixture is drawn into charging cylinders 51A and 51B as the pistons 56A and 56B move outwardly and is compressed as these pistons (respectively) move inwardly.

Connections Between Cylinders

Charging cylinder 51B communicates with the ports 78A through a conduit or tube 90A. When charge injection ports 78A are opened, near the outer end of travel of piston 52A, the compressed air-fuel mixture from charging cylinder 51B passes through conduit 90A (FIG. 11) and through the ports 78A into the interior of cylinder 40A. A like conduit 90B connects charging cylinder 51A to charge injection ports 78B. Likewise, air compressed in charging cylinder 41B can flow through a conduit or tube 92B to air injection ports 77A, and through a branch 92B1 to the auxiliary air injection port 80A. In the other direction, air compressed in charging cylinder 41A can flow through a conduit or tube 92A to air injection ports 77B, and through a branch 92A1 to the auxiliary air injection port 80B. Thus, the charging cylinders are cross-connected to the ports of the adjacent power cylinder.

As in my prior patent disclosure, the engine can be fitted with a conventional pressurized lubrication system for the crankshaft and connecting rods bearings and other rotating parts. Part of the lubricating oil flow can also function as coolant. Thus, coolant oil can be projected through nozzles into the hollow interior of the pistons to cool them.

Operating Cycle

Figure 12:
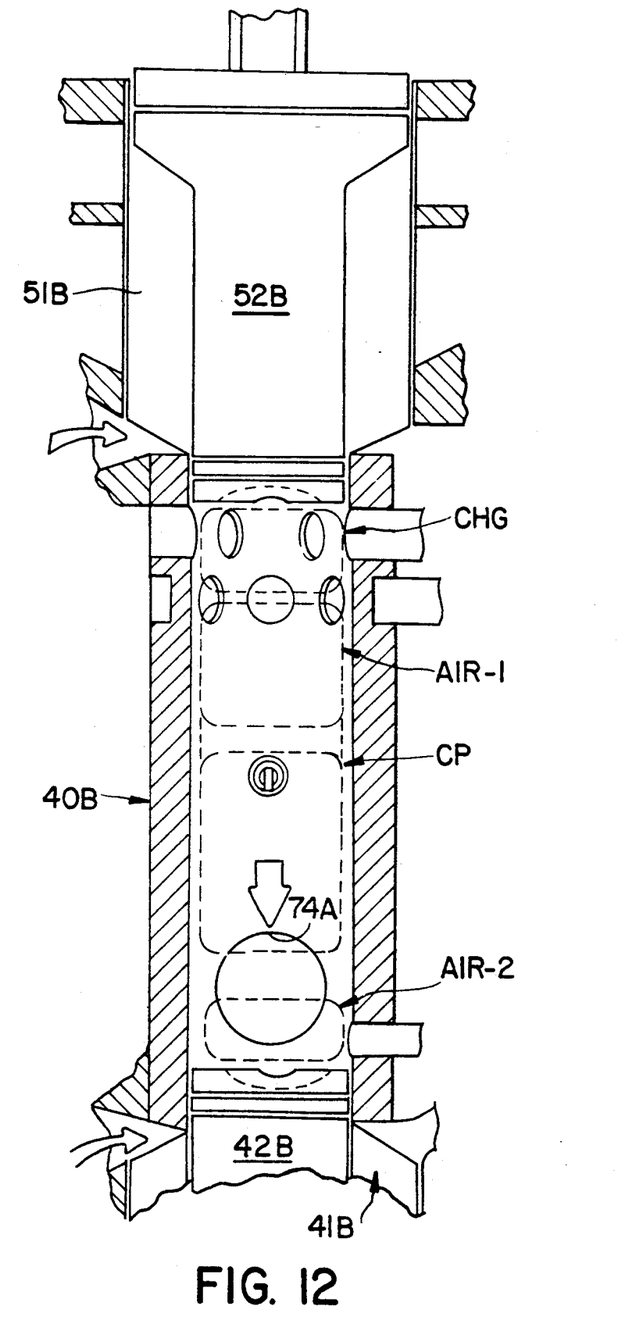
FIG. 12 is a schematic view of one cylinder, with the relationship of the various gas flows generally indicated.

Operation of the engine can be most clearly understood by reference to FIGS. 11 and 12. As the pistons 42A and 52A move outwardly toward the position shown in FIG. 2, air is drawn into charging cylinder 41A, and air-fuel mixture is drawn into charging cylinder 51A. As pistons 42A and 52A return inwardly, the air in charging cylinder 41A is compressed and the air-fuel mixture in charging cylinder 51A is also compressed. As the pistons 42A and 52A move inwardly, the pistons 42B and 52B move outwardly (FIG. 3) in a power stroke, following ignition of a charge in cylinder 40B. When piston head 45B reaches and begins to open exhaust ports 74B, 76B (FIG. 3), products of combustion begin to flow out of cyliner 40B. In FIG. 12, the phantom outline CP indicates the general position of the burning charge, and the corresponding arrow indicates the direction of exhaust flow out ports 74B, 76B. Then, as the piston head 55B reaches and opens air-injection ports 77B, air is injected from charging cylinder 41A through the conduit 92A and ports 77B. This inflow of compressed and cool purge air is indicated in FIG. 12 by the phantom outline AIR-1.

This compressed air acts to enhance the now established exhaust flow, and helps to purge products of combustion from the cylinder 40B. Then, as the piston 55B moves further outward and opens the fuel-injection ports 78B, the air-fuel mixture in charging cylinder 51A is injected through the conduit 90B and ports 78B into cylinder 40B to form a charge for the next cycle. This is indicated by the phantom outline CHG in FIG. 12; note that charge CHG is separated from the products of combustion CP by the air AIR-1. As previously noted, the auxiliary air injection port 80B is opened at approximately the same time as the charge injection port 78B. The phantom outline AIR-2 indicates this air, and the corresponding arrow indicates the action of this compressed air contra to the exhaust flow of products of combustion CP through the exhaust ports.

Phase Adjustment of Opposed Pistons

The invention provides an optional arrangement for adjusting the phasing of the exhaust piston and corresponding charge control piston in a common cylinder. During engine operation, particularly as r.p.m. and load increase, it is desirable to avoid pre-ignition of air-fuel charges compressed between the two main piston heads (45A, 55A) and to continue to promote efficient scavenging of products of combustion at the higher rotational speeds.

One of the optional features of this invention is the provision of a piston phasing control which responds to certain engine operating conditions, such as increasing r.p.m., to modify the relative motion of the opposed pistons and particularly of their cooperating heads in a common cylinder. Basically, a rotational speed responsive mechanism is connected between the exhaust piston 42A and 42B and crankshaft 28A. This mechanism is shown diagrammatically in FIG. 7, it being understood that it acts to advance the motion of both exhaust piston 42A, 42B with respect to the rotation of the crankshaft in response to a predetermined engine r.p.m. Thus, the exhaust piston head 45A will pass through its top dead center position slightly before piston head 52A passes through its top dead center position. A maximum phase difference of no more than 12° to 15° crank angle is suitable.

The exhaust piston head 45A will then open the exhaust port 74A sooner in the cycle, by the amount of such phase displacement, and the timing of the auxiliary air injection will likewise be advanced. However, more "dwell time" will be achieved during which the piston heads are closely spaced for a more complete combustion. Some minor decrease in compression ratio, and in the maximum compression at the time of ignition, will result, but the net effect is to smooth the running of this type of engine at higher r.p.m, for example at 7500 r.p.m. and above.

Figure 7:
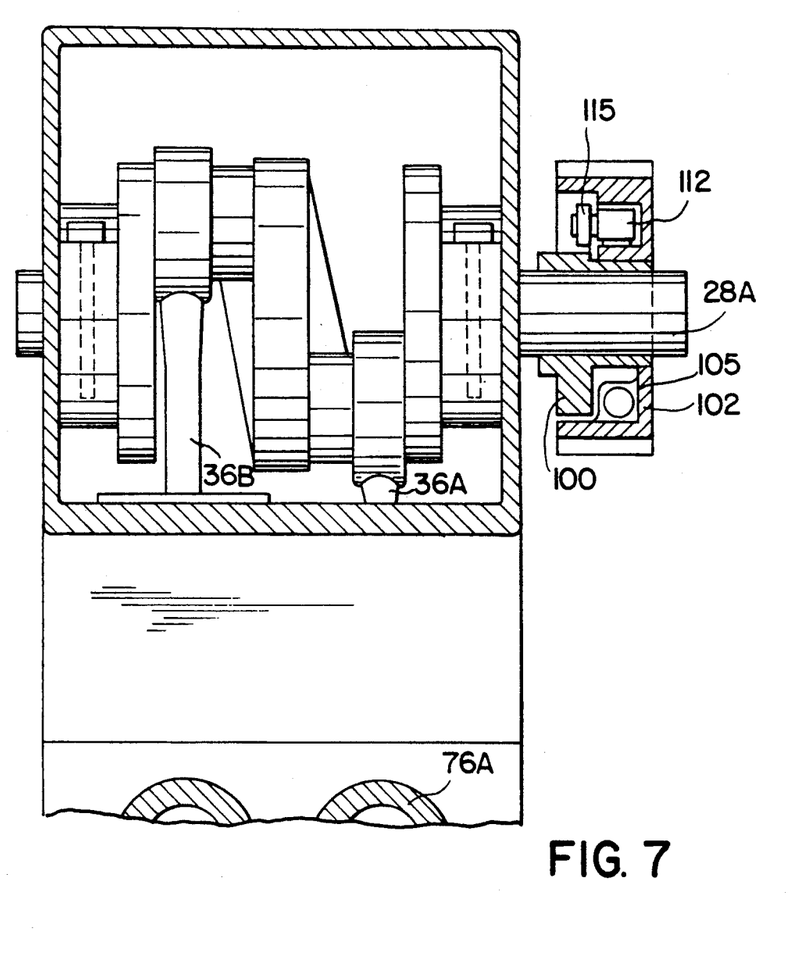
FIG. 7 is a partial view similar to FIG. 1, showing an optional piston phase control.
Figure 8:
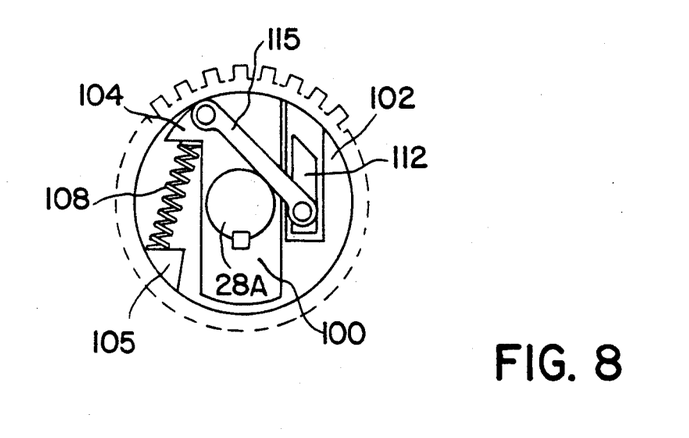
FIG. 8 is a schematic view of the control device shown in FIG. 7.

The advancing mechanism is shown schematically in FIGS. 7 and 8. Crankshaft 28A has a rotor 100 keyed to it, and the rotor is fitted within a cup-shaped cylindrical member 102, on which the gear teeth are formed. The rotor has a radially extending lug 104, and the member 102 has an opposing lug 105, each of which include bores or sockets that receive the opposite ends of a compression spring 108, all located on one side of rotor 100. On the opposite side of rotor 100 a slot 110 is formed in member 102, and a weight 112 is received in, and can slide along, such slot. The weight and the rotor are connected by a link 115, which has pivot connections at its opposite ends to rotor 100 and weight 112.

Increase in engine r.p.m. will cause weight 112 to move outward due to centrifugal force, and this action causes link 115 to move rotor 100 within member 102, against the force of spring 108. At full displacement of this mechanism, the lugs 104, 105 will engage to define the limit of the relative rotational motion between the gear and the crankshaft.

Throttle Controls

Figure 9:
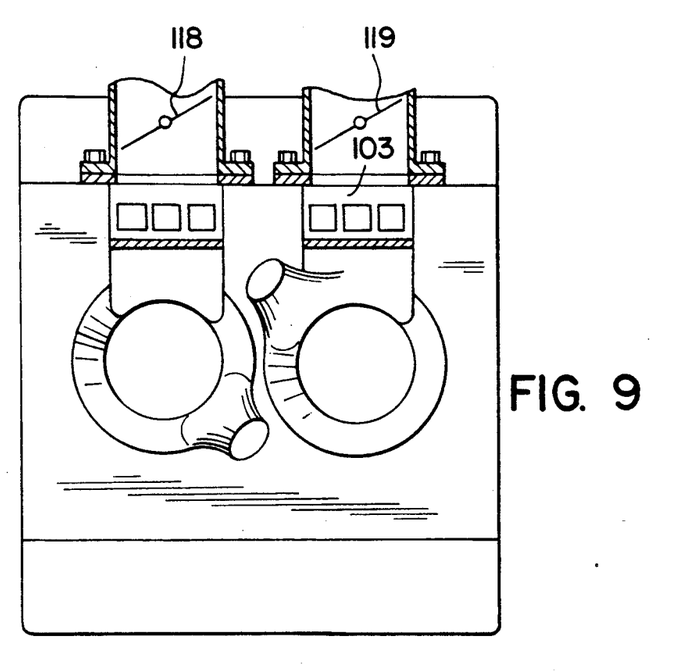
FIG. 9 is a view showing optional throttle plates controlling the flow of compressed air from the air charging cylinders to the principal air injection ports.

Since this type of engine is intended primarily to operate on a modified Otto cycle (as distinguished from a compression ignition Diesel cycle), throttle plates are conventionally used at the carburetor or TBI units which produce the air-fuel charge. Those throttle plates have not been illustrated, since they are well known. FIG. 9 shows the additional optional throttle plates 118, 119 at the inlets to the charging cylinders 41A, 41B. These may be appropriately linked to the main throttle plates if coordinated such control is needed in certain specific constructions of the engine.

Water Injection

Figure 10:
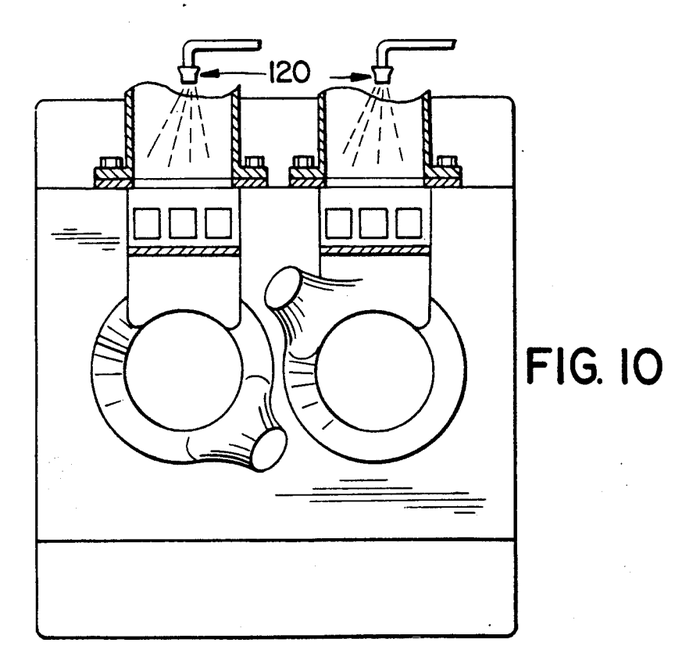
FIG. 10 is a view similar to FIG. 9, showing optional water injectors at the air charge inlets to the air charging cylinders.

As is generally known, appropriate injection of water (often in fact a water-alcohol mixture) can stabilize combustion at high speeds and under heavy loads. The water charge vaporizes and thus absorbs some heat from the compressed fuel-air mixture, preventing or delaying tendencies of pre-ignition. At lower speeds and lighter loads, this water injection is not needed, and in fact can disturb normal running. In the present engine, wherein cooling is achieved primarily through heat removed through the pressurized lubrication system, and by the injection of compressed air during each cycle, at each end of the cylinder over the head of each piston, water (or a water plus additive mixture) can optionally be added into the compressed air injection system. Suitable injectors for this purpose are shown schematically at 120 in FIG. 10.

The water addition will counter heating of air compressed in the charging cylinders, thus resulting in a lower temperature and higher density of the injected air, and promote the cooling function of the injected compressed air into the cylinders. At higher engine speeds, this feature takes on additional importance. The presence of water droplets or vapor in the cylinder along with the fuel-air charge will tend to slow and even out the rate of combustion, for a better, more thorough combustion and smoother running of the engine.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims. For example, the foregoing disclosure illustrates a pair of cylinders operating cooperatively. It should be understood that additional pairs of cylinders, with rods attached to the same crankshafts, can be added to increase the size and power of the engine. Also, the relative volumes of the combustion (main) cylinders and the charging cylinders can be adjusted to achieve a particular desired supercharge ratio.

What is claimed is:

1. In an opposed piston two cycle engine of the type having a cylinder and a pair of pistons operating in counter movement within said cylinder, there being an exhaust port from said cylinder controlled by one of said pistons and a charging port controlled by the other of said pistons, said pistons having main heads defining between them a combustion chamber, and there being an air inlet port adjacent said charging port and closer to said combustion chamber than said charging port; the improvement comprising
   an auxiliary air inlet port located near the end of the path of said one piston on the opposite side of said exhaust port from said combustion chamber and controlled by said one piston, and
   means for supplying compressed air to each of said air inlet ports
   whereby air is admitted to said cylinder first in a region between the products of combustion from said combustion chamber and said charging port when exhaust flow initiates through said exhaust port and further air is admitted to said cylinder in a region on the opposite side of said exhaust port from said combustion chamber.

2. The method of operating an opposed piston two cycle engine of the type having a cylinder and a pair of pistons operating in counter movement within the cylinder, there being an exhaust port from the cylinder controlled by one of the pistons and a charging port controlled by the other of the pistons, the pistons having main heads defining between them a combustion chamber, and there being an air inlet port adjacent the charging port and closer to the combustion chamber than said charging port and an auxiliary air inlet port located near the end of the path of the one piston on the opposite side of the exhaust port from the combustion chamber and controlled by the one piston, and a means for supplying compressed air to each of the air inlet ports; the steps of
   injecting air into the cylinder in a region between the products of combustion from the combustion chamber and the charging port when exhaust flow initiates through the exhaust port, and then
   injecting further air into the cylinder in a region on the opposite side of the exhaust port from the combustion chamber contra to the exhaust flow of products of combustion through the exhaust port.

3. In an opposed piston two cycle engine of the type having a cylinder and a pair of pistons operating in counter movement within said cylinder, there being an exhaust port from said cylinder controlled by one of said pistons and a charging port controlled by the other of said pistons, said pistons having main heads defining between them a combustion chamber, and there being an air inlet port adjacent said charging port and closer to said combustion chamber than sad charging port, a crankshaft and connecting rod system attached to said pistons to cause 180° out of phase motion of said pistons,; the improvement comprising
   means in sad crankshaft and connecting rod system for changing the phase relation of said pistons to advance said one piston with respect to said other piston in response to a change in engine operating condition including a weight responsive to centrifugal force so as to cause the phase change in response to predetermined engine r.p.m.

4. In an opposed piston two cycle engine of the type having a cylinder and a pair of pistons operating in counter movement within said cylinder, there being an exhaust port from said cylinder controlled by one of said pistons and a charging port controlled by the other of said pistons, said pistons having main heads defining between them a combustion chamber, and there being an air inlet port adjacent said charging port and closer to said combustion chamber than said charging port, a crankshaft and connecting rod system attached to sad pistons to cause 180° out of phase motion of said pistons,; the improvement comprising
   means in said crankshaft and connecting rod system for changing the phase relation of said pistons to advance said one piston with respect to said other piston in response to a change in engine operating condition,
   an auxiliary air inlet port located near the end of the path of said one piston on the opposite side of said exhaust port from said combustion chamber and controlled by said one piston, and
   means for supplying compressed air to each of said air inlet ports.

5. In an opposed piston two cycle engine of the type having a pair of power cylinders each having a pair of main pistons with opposed heads operating in counter movement within the associated said power cylinder, a crankshaft and connecting rod system attached to said main pistons to cause 180° out of phase motion of each pair of main pistons, each power cyliner having an exhaust port from said power cylinder controlled by one of the pair of said main pistons and a charging port controlled by the other of the same pair of said main pistons, said main pistons having main heads defining between them central combustion chambers in each of said power cylinders, each said power cylinder having an air inlet port adjacent said charging port and closer to said combustion chamber than said charging port, a pair of charging cylinders located at opposite ends of each of said power cylinders, and charging pistons operating in said charging cylinders and connected to and movable with said main pistons; the improvement comprising
   an auxiliary air inlet port located near the end of the path of said one piston on the opposite side of said exhaust port from said combustion chamber and controlled by said head of said one main piston, and
   means for supplying compressed air to each of said air inlet ports
   whereby air is admitted to each of said power cylinders first in a region between the products of combustion from said combustion chamber and said charging port when exhaust flow initiates through said exhaust port and further air is admitted to each said power cylinder in a region on the opposite side of said exhaust port from said combustion chamber.

6. An engine as defined in claim 5, further comprising means for injecting water into said charging cylinders to increase the density and lower the temperature of air and/or fuel-air charges transferred into said power cylinders.

7. An engine as defined in claim 6, further comprising means in said crankshaft and connecting rod system for changing the phase relation of said pistons to advance said one piston with respect to said other piston in response to increase in engine speed.

8. The method defined in claim 6, further comprising adding water vapor to the injected air to enhance the density and lower the temperature of the additional air.

* * * * *